United States Patent [19]

Denning

[11] Patent Number: 4,691,877
[45] Date of Patent: Sep. 8, 1987

[54] COMPOUND HELICOPTER AND POWERPLANT THEREFOR

[75] Inventor: Ralph M. Denning, Bristol, England

[73] Assignee: Rolls-Royce plc, London, England

[21] Appl. No.: 930,990

[22] Filed: Nov. 14, 1986

Related U.S. Application Data

[63] Continuation of Ser. No. 555,090, Nov. 25, 1983, abandoned.

[30] Foreign Application Priority Data

Dec. 1, 1982 [GB] United Kingdom ............... 8234318

[51] Int. Cl.⁴ .............................................. B64C 27/22
[52] U.S. Cl. ........................................ 244/6; 244/207; 244/53 R
[58] Field of Search ............... 244/6, 7 R, 12.5, 23 D, 244/17.19, 17.21, 207, 53 R

[56] References Cited

U.S. PATENT DOCUMENTS

| | | | |
|---|---|---|---|
| 2,687,779 | 8/1954 | Peterson ................................. | 244/6 |
| 2,940,691 | 6/1960 | David ................................... | 244/7 R |
| 3,332,644 | 7/1967 | Whittley ................................ | 244/207 |
| 3,368,778 | 2/1968 | Wilde et al. ........................... | 244/6 |
| 3,375,997 | 4/1968 | Gist, Jr. ................................ | 244/6 |
| 3,432,123 | 3/1969 | Conway et al. ....................... | 244/207 |
| 3,442,470 | 5/1969 | Farbridge et al. .................... | 244/207 |
| 3,478,986 | 11/1969 | Roed .................................... | 244/207 |
| 3,503,572 | 3/1970 | Hafner .................................. | 244/7 R |
| 3,678,690 | 7/1972 | Shohet et al. ......................... | 244/7 R |
| 3,721,406 | 3/1973 | Hurlbert ............................... | 244/207 |
| 3,776,491 | 12/1973 | Oulton .................................. | 244/217 |
| 3,884,433 | 5/1975 | Alexander ............................ | 244/207 |
| 4,044,971 | 8/1977 | Pharris ................................. | 244/7 R |
| 4,175,385 | 11/1979 | Nash ..................................... | 244/12.5 |

FOREIGN PATENT DOCUMENTS

| | | | |
|---|---|---|---|
| 1079296 | 8/1967 | United Kingdom ................ | 244/207 |
| 81338 | 7/1963 | France ................................ | 244/207 |
| 980608 | 1/1965 | United Kingdom . | |
| 1024969 | 4/1966 | United Kingdom . | |
| 1108454 | 3/1968 | United Kingdom . | |
| 1120658 | 7/1968 | United Kingdom . | |

Primary Examiner—Jeffrey V. Nase
Assistant Examiner—Rodney Corl
Attorney, Agent, or Firm—Parkhurst & Oliff

[57] ABSTRACT

Figure 1:
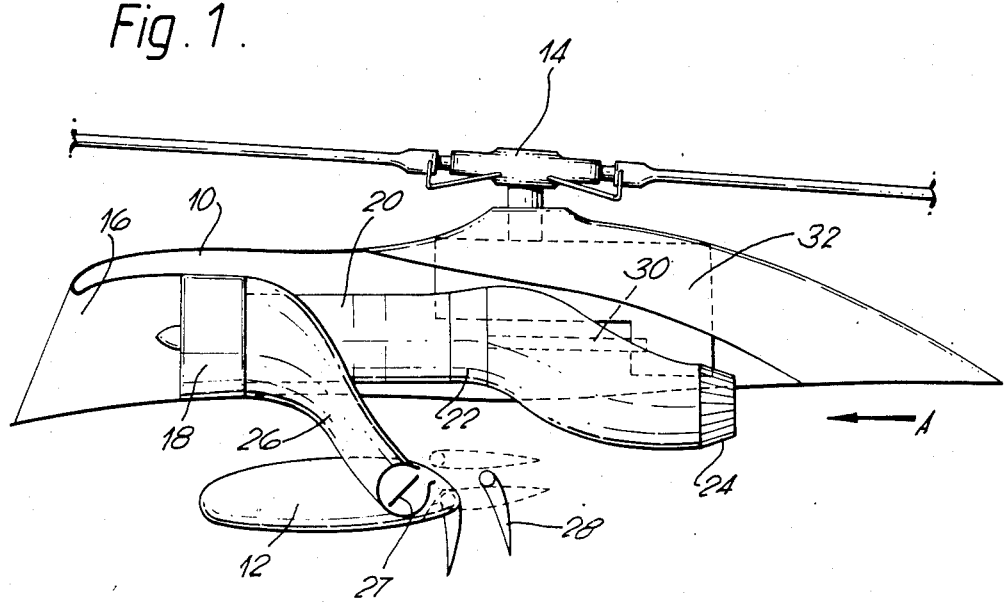

A compound helicopter shown in FIG. 1 of the drawings has wings 12 in addition to a helicopter rotor 14 and has twin powerplants 16 each including a low pressure compressor 18, a core engine 20, a power turbine 22 driven by the core engine and connected through a gearbox 32 to drive the helicopter rotor, and a variable area final, propulsion nozzle 24 which receives the exhaust from the power turbine. Augmentor wing flaps 28 are provided on the wings and fed with air from the low pressure compressor for providing additional lift and thrust from the wings. In operation, at take-off the nozzles 24 are fully opened and all of the power produced by the power turbines 22 is used in driving the helicopter rotor for producing lift. In addition, the augmentor wing flaps 28 are directed downwardly to provide lift. For forward flight the nozzles 24 are closed down, reducing the power to the rotor and slowing it down, while at the same time generating forward thrust. Additional forward thrust is derived from the flow of compressed air through the augmentor wing flaps 28.

11 Claims, 2 Drawing Figures

U.S. Patent   Sep. 8, 1987   4,691,877

COMPOUND HELICOPTER AND POWERPLANT THEREFOR

This is a continuation of application Ser. No. 555,090 filed Nov. 25, 1983, now abandoned.

The present invention relates to compound helicopters and powerplants therefor. The term compond helicopter is used to denote a helicopter having wings in addition to the normal helicopter rotor.

Compound helicopters are not new, and several different approaches have been used in their design. For example, it has been proposed to use separate engines to provide power for driving the rotor and for producing horizontal propulsion. This approach has the disadvantage that during the cruise mode of operation, the engine driving the rotor is throttled back or even shut down, and then becomes dead weight, and the cruise engines do not contribute to the lift at take-off.

An alternative approach, therefore, has been to make the same engine or engines perform the tasks of driving the rotor and providing forward propulsive thrust. This entails the problem of switching from one function to the other, and several different proposals have been made for doing this, none of which have yet found acceptance.

Examples of various compound helicopters and powerplants are disclosed in UK Patents Nos. 1,024,969, 1,108,454 and 1,120,658. These patent specifications disclose twin-engined helicopters and various methods by which the two engines are switched from driving the helicopter rotor or rotors to providing horizontal thrust. In all of these proposals the engines are either used to provide lift or forward thrust, and the disadvantage of this arrangement is that the engine is slow to change over from one mode of operation to the other.

An arrangement which does not suffer from this disadvantage is disclosed in U.K. Patent No. 980,608. In this arrangement a variable pitch fan is provided, and both the fan and the helicopter rotor are driven at all times through gearing from the engine low pressure turbine. The amount of power going to the helicopter rotor is varied by changing the pitch of the blades to increase or decrease the power required for driving the fan. However, in this arrangement, as in the other arrangements referred to above, the engine is specifically designed for use as a compound helicopter powerplant. Also the variable pitch fan is of relatively large diameter and this puts a limitation on the type of aircraft installation in which it can be used.

It is an object of the present invention to provide a powerplant for a compound helicopter which consists of a standard engine adapted to provide the power for vertical lift and horizontal propulsion with a minimum of modification.

According to the present invention a compound helicopter comprises a gas turbined powerplant having a core engine, a power turbine driven by the exhaust of the core engine and connected to drive the helicopter rotor, and a variable area final propulsion nozzle downstream of the power turbine which receives the exhaust from the power turbine, and controls the power supplied to the helicopter rotor.

By this means the variable area nozzle can be used to control both the power generated by the power turbine for producing lift from the helicopter rotor, and the propulsive thrust generated by the engine for forward propulsion. The variable area final nozzle is a relatively simple modification to make to a standard engine for providing the variation in power between lift and forward propulsion, (in addition, that is, to the drive shaft and gearbox for driving the helicopter rotor which is essential in all helicopter powerplants). This proposal also avoids the problems of the above-mentioned prior proposals in that the helicopter rotor is driven at all times, while the power split between lift and forward propulsion from the powerplant is variable over a wide range of values.

Figure 2:
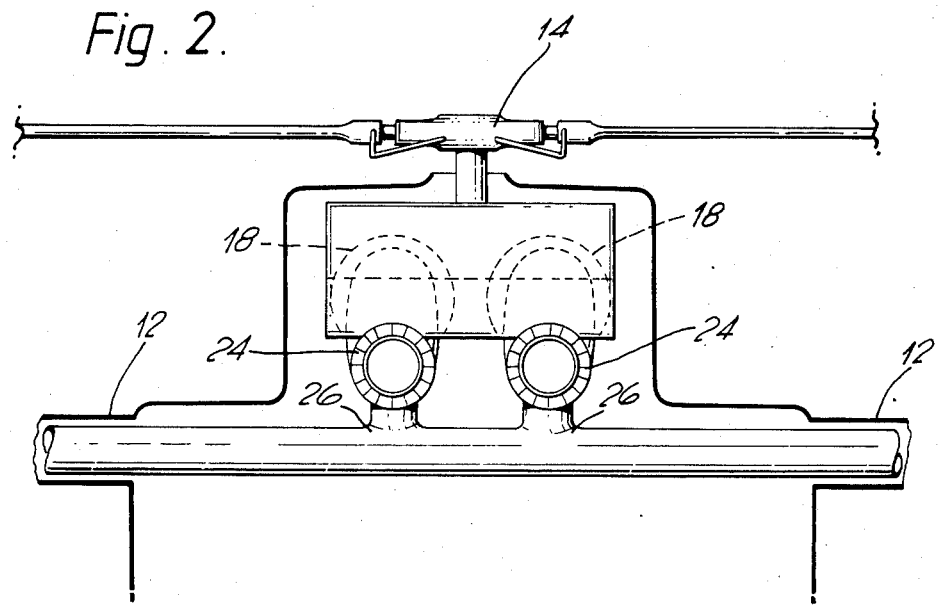

An example of the invention will now be more particularly described with reference to the accompanying drawings in which:

FIG. 1 shows the top part of a twin-engined compound helicopter of the invention with its helicopter rotor, augmentor wing, and gas turbine engine powerplants, and, FIG. 2 is a view on arrow A of FIG. 1.

Referring now to the drawings, there is shown a compound helicopter 10 having wings 12, one on each side, and a helicopter rotor 14. Two gas turbine engine powerplants 16 are provided each having a low pressure compressor 18, a core engine 20 which drives the low pressure compressor, a power turbine 22 which is driven from the exhaust of the core engine, and a variable area final nozzle 24.

The arrangement of the parts of each of the powerplants are as follows: At least a part of the air flow compressed by each low pressure compressor is passed to the wings 12 via ducting 26, and the wings have augmentor flaps 28 at the trailing edges thereof. The augmentor wing is known per se and its operation is not described here in detail. It is sufficient to say that the air from the ducting 26 passes to atmosphere through the flaps 28 and induces air flowing over the aircraft wing to pass between the flaps and to stick to the top flap to increase the wing lift. The flaps 28 are also pivotable between the position shown in full lines, which provides additional downwardly directed thrust to add to the lift generated by the rotor 14, and the position shown in dotted lines which provides forward thrust. The compressed air from the two engines is supplied to opposite sides of a diaphragm 27 which divides the ducting 26 longitudinally. Thus both engines supply air to the flaps 28 along the whole length of the wing and, failure of one engine will not affect the flow from the other one. The core engine 20 produces power to drive the compressor 18, and the exhaust from the core engine passes through the power turbine 22. A shaft 30 and gearbox 32 interconnecf both of the power turbines 22 with the helicopter rotor 14 to drive the rotor. The exhaust from each of the power turbines passes to atmosphere through the variable area final nozzle, which, in this example, is shown pointing rearwards all of the time, but which could, if desired, be vectorable to direct the exhaust gases downwardly, for increasing lift, or sideways for attitude control.

The operation of the compound helicopter is as follows:

For take-off each of the gas turbine powerplants is run at maximum power with the variable area final nozzle in its maximum area position. This provides the greatest pressure drop across the power turbine and hence maximum drive to the rotor 14 which generates most of the lift, and minimum propulsive thrust from the final nozzle. Additional lift is generated by the compressed air from the low pressure compressor passing through the augmentor flaps 28 which are pivoted to direct the air downwardly. Thus the helicopter can take off vertically with only a very minor part of the energy remaining in the exhaust gases creating virtually no forward thrust from the variable area final nozzles 24. Clearly, if the variable area final nozzles 24 are made to be vectorable to direct the exhaust gases downwardly, any energy remaining could be directed to provide still further lift.

Once airborne, if a conventional tilting helicopter rotor is used, forward flight can be initiated in the normal way. Alternatively the area of the final nozzles can be adjusted to produce some forward thrust which will provide some forward velocity so that gradually the wings will start to produce lift. This process can be hastened by gradually pivoting the augmentor flaps 28 towards the horizontal position which provides a gradually increasing forward thrust. When the wings have started to contribute to the lifting force necessary to keep the helicopter in the air, the variable area final nozzles 24 are closed down to off-load the power turbine 22 thus reducing the power to the helicopter rotor 14 and increasing still further the forward thrust on the helicopter.

The reduction of power to, and consequent slowing down of, the helicopter rotor is such as to enable relatively high forward speeds of the order of 250 mph to be achieved without the rotor tip mach number of the advancing rotating blades becoming excessive.

The advantages of the augmentor wing as part of the combination are that it has a high lift coefficient and produces low drag at medium speed. It also allows the wing plan area to be minimized which reduces the effect of the rotor downwash on the wing lift.

A further advantage of a compound helicopter as described above is that by simply choosing an appropriate nozzle area, enough forward thrust can be produced without a significant loss of lift from the rotor, to enable the helicopter to perform a short take-off if overloaded, by running forward on the ground until the wing lift is sufficient to provide lift-off. This can significantly increase the range of the helicopter by increasing the amount of fuel carried at take-off.

For the avoidance of doubt the term "low pressure compressor" used throughout this specification is to be understood to include the widely used alternative term a "fan".

I claim:

1. A compound helicopter comprising:
   at least one helicopter rotor:
   at least one wing having at least one lift augmentation device for producing lift in addition to that normally produced by the wings in forward flight;
   at least one gas turbine powerplant having:
   a core engine;
   a low pressure compressor driven by the core engine, and
   a power turbine driven by the exhaust of the core engine and connected to drive the at least one helicopter rotor;
   ducting to convey at least part of the air compressed by the low pressure compressor to said at least one wing; and
   a variable area final propulsion nozzle downstream of the power turbine, said nozzle receiving the exhaust from the power turbine and being operable to vary the power absorbed by the power turbine.

2. A compound helicopter as claimed in claim 1 and in which the at least one lift augmentation device comprises augmentor flaps through which the flow received by the wing from the low pressure compressor is exhausted, the flaps being pivotable between a position directing the exhausting air downwardly and a position directing the exhausting air rearwardly.

3. A compound helicopter as claimed in claim 1 and in which the variable area final nozzle is vectorable between lift thrust and forward propulsion thrust positions.

4. A compound helicopter as claimed in claim 2 and in which the variable area final nozzle is vectorable between lift thrust and forward propulsion thrust positions.

5. A compound helicopter as claimed in claim 1, wherein two wings are provided and wherein the ducting conveys the compressed air to each of the wings.

6. A compound helicopter as claimed in any of claims 1, 2, 3, 4, or 5 and in which two gas turbine powerplants are provided, the power turbines of each being coupled through a gearbox to drive the rotor.

7. A compound helicopter as claimed in claim 6 and in which the ducting is divided longitduinally by a diaphragm and the air compressed by the two low pressure compressors is directed to opposite sides of the diaphragm whereby failure of one of the core engines and its adjoining low pressure compressor will not affectthe supply of compressed air by the adjoining low pressure compressor of the other engine to the augmentor wing flaps.

8. A powerplant for a compound helicopter which has a main lift rotor and at least one wing provided with at least one lift augmentation device for producing lift in addition to that normally produced by the wing in forward flight, the powerplant comprising:
   at least one gas turbine engine having:
   a low pressure, compressor;
   a core engine which drives the compressor;
   an output shaft connectable to drive the main lift rotor and
   a power turbine driven by the exhaust of the core engine and connected to drive the output shaft;
   ducting for conveying at least part of the air compressed by the low pressure compressor to the at least one wing; and
   a variable area propulsion nozzle downstream of the power turbine, said nozzle receiving the exhaust from the power turbine and being operable to vary the powEr absorbed by the power turbine and simultaneously vary the propulsive thrust produced by the nozzle.

9. A powerplant as claimed in claim 8 wherein the variable area nozzle fo said engine is vectorable between lift thrust anofforward propulsive thrust positions.

10. A powerplant as claimed in claim 8 wherein two gas turbine engines are provided and the power turbines of each engine are coupled through a gearbox to drive a common output shaft.

11. A power plant as claimed in claim 10, wherein the ducting is divided longitudinally by a diaphragm and the air compressed by one low pressure compressor is directed to one side of the diaphragm and the air compressed by the other low pressure compressor is supplied to the other side of the diaphragm, the diaphragm and ducting being constructed and arranged so that failure of one of the engines and its adjoining low pressure compressor does not affect the supply of compressed air by the adjoining low pressure compressor of the other engine to said wing.

* * * * *